United States Patent
Tegel et al.

(10) Patent No.: US 10,239,753 B2
(45) Date of Patent: Mar. 26, 2019

(54) COMPOSITE MATERIAL FOR HYDROLYTICALLY GENERATING HYDROGEN, DEVICE FOR HYDROLYTICALLY GENERATING HYDROGEN, METHOD FOR GENERATING HYDROGEN, DEVICE FOR GENERATING ELECTRIC ENERGY, AND POSSIBLE APPLICATIONS

(71) Applicant: FRAUNHOFER-GESELLSCHAFT ZUR FÖRDERUNG DER ANGEWANDTEN FORSCHUNG E.V., München (DE)

(72) Inventors: Marcus Tegel, Dresden (DE); Lars Röntzsch, Dresden (DE); Bernd Kieback, Possendorf (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 0 days.

(21) Appl. No.: 15/318,265

(22) PCT Filed: Jun. 10, 2015

(86) PCT No.: PCT/EP2015/062896
§ 371 (c)(1),
(2) Date: Dec. 12, 2016

(87) PCT Pub. No.: WO2015/189247
PCT Pub. Date: Dec. 17, 2015

(65) Prior Publication Data
US 2017/0107101 A1  Apr. 20, 2017

(30) Foreign Application Priority Data
Jun. 13, 2014 (DE) ......... 10 2014 211 422

(51) Int. Cl.
*C01B 3/06* (2006.01)
*B01J 7/02* (2006.01)

(52) U.S. Cl.
CPC ............ *C01B 3/065* (2013.01); *B01J 7/02* (2013.01); *Y02E 60/362* (2013.01); *Y02P 20/129* (2015.11)

(58) Field of Classification Search
CPC ............ B22C 1/2246; C04B 26/122; C04B 2111/00939; C04B 2111/0087;
(Continued)

(56) References Cited

U.S. PATENT DOCUMENTS 5,602,192 A * 2/1997 Yoshida .......... B22C 1/2246
164/526
6,572,836 B1 * 6/2003 Schulz .............. B01J 8/382
423/648.1
(Continued)

FOREIGN PATENT DOCUMENTS

CN 102060266 A 5/2011
JP 2014-028714 A 2/2014
(Continued)

OTHER PUBLICATIONS

"Technical Data Sheet", 2016, Eastman Chemical Company p. 1-2.*
(Continued)

*Primary Examiner* — Amber R Orlando
*Assistant Examiner* — Syed T Iqbal
(74) *Attorney, Agent, or Firm* — Leydig, Voit & Mayer, Ltd.

(57) ABSTRACT

The invention relates to compact and lightweight disposable accumulators for generating electric energy with extremely high energy densities (>1 kWh/kg and >k Wh/liter), which are of immense interest in many areas of application. One possibility for implementing such energy accumulators con-
(Continued)

sists in using metal hydrides in hydrogen generators in which hydrogen is generated by hydrolytically splitting off a proton from water in conjunction with the metal hydride. The chemical energy stored in the hydrogen can then be converted into electric energy in a fuel cell in a second step. Only half of the generated hydrogen originates from the metal hydride during the hydrolysis reaction; the water used for the hydrolysis process supplies the other half.

19 Claims, 11 Drawing Sheets

(58) Field of Classification Search
CPC .. C01B 3/065; C01B 2203/066; H01M 8/065; H01M 8/04097; H01M 8/04156; Y02P 20/129; Y02E 60/362
See application file for complete search history.

(56) References Cited

U.S. PATENT DOCUMENTS

| | | |
|---|---|---|
| 2002/0166286 A1 | 11/2002 | McClaine et al. |
| 2008/0075987 A1 | 3/2008 | Kindler et al. |
| 2008/0090121 A1 | 4/2008 | Zhao |
| 2009/0304558 A1 | 12/2009 | Patton et al. |
| 2009/0324452 A1 | 12/2009 | Salinas et al. |
| 2010/0150824 A1 | 6/2010 | Withers-Kirby et al. |
| 2013/0004413 A1 | 1/2013 | Vajo et al. |

FOREIGN PATENT DOCUMENTS

| | | |
|---|---|---|
| WO | WO 2001/068517 A1 | 9/2001 |
| WO | WO 2009/046471 A1 | 4/2009 |
| WO | WO 2014/013246 A2 | 1/2014 |
| WO | WO 2014/198948 A1 | 12/2014 |

OTHER PUBLICATIONS

European Patent Office, International Search Report in International Application No. PCT/EP2015/062896 (dated Sep. 16, 2015).
European Patent Office, Written Opinion in International Application No. PCT/EP2015/062896 (dated Sep. 16, 2015).
International Bureau of WIPO, International Preliminary Report on Patentability (Ch. 2) in International Application No. PCT/EP2015/062896 (dated Sep. 16, 2015).
Response to Written Opinion and Article 34 Amendments filed in International Application No. PCT/EP2015/062896 (dated Aug. 3, 2016).
Appendix 1 to Response to Written Opinion: Brown et al., "Sixty Years of Hydride Reductions," *Reductions in Organic Synthesis, ACS Symposium Series*, vol. 641, Chapter 1, Aug. 1996 (pp. 1-30).
Appendix 2 to Response to Written Opinion: Schöne, "Untersuchung der Bildungstendenz oberflächlichen Magnesiumhydroxids auf die Hydrolyseeigenschaften und die Langzeitstabilität aktivierter Magnesiumhydrid-Kompositmaterialien," ("Investigation of the formation tendency of superficial magnesium hydroxide on the hydrolysis properties and the long-term stability of activated magnesium hydride composite materials") Bachelor Thesis, Technical University, Dresden, 112 pgs. (2014).
Appendix 3 to Response to Written Opinion: Musco et al., "$MgH_2$ as a Reducing Agent in the Presence of Transition Metal Halides. III. Reduction of Ketones and Aldehydes," *Inorganica Chimica Acta* 172: 1-2 (1990).
Tegel, "Optimisation of the chemical stability of $MgH_2$ pastes for hydrolysis reactions," 18 pgs. (unpublished lecture) submitted with Response to Written Opinion dated Aug. 3, 2016 as Appendix 4.
Tegel, Unpublished experimental data (6 pgs) submitted with Response to Written Opinion dated Aug. 3, 2016 as Appendix 5.
European Patent Office, Notification under Article 94 (3) EPC in European Patent Application No. 15 729 135.2 (dated Jan. 3, 2018).

\* cited by examiner

COMPOSITE MATERIAL FOR HYDROLYTICALLY GENERATING HYDROGEN, DEVICE FOR HYDROLYTICALLY GENERATING HYDROGEN, METHOD FOR GENERATING HYDROGEN, DEVICE FOR GENERATING ELECTRIC ENERGY, AND POSSIBLE APPLICATIONS

CROSS-REFERENCE TO RELATED APPLICATIONS

This patent application is the U.S. national phase of International Application No. PCT/EP2015/062896, filed on Jun. 10, 2015, which claims the benefit of German Patent Application No. 10 2014 211 422.5, filed Jun. 13, 2014, the disclosures of which are incorporated herein by reference in their entireties for all purposes.

Compact and light disposable stores for the production of electrical energy with extremely high energy densities (>1 kWh/kg and >1 kWh/liter) are of immense interest for many fields of application. One possibility to realise such energy stores is by the use of metal hydrides in hydrogen generators in which hydrogen is generated by means of hydrolytic splitting of a proton from water in conjunction with the metal hydride. The chemical energy stored in the hydrogen can then be converted, in a second step, into electrical energy in a fuel cell. In the hydrolysis reaction, only half of the produced hydrogen originates from the metal hydride—the water used for the hydrolysis provides the other half.

Since water of various compositions is present virtually ubiquitously on earth, the production of hydrogen by hydrolysis can also be effected with locally present, ion-containing water. In this way, only the device for the hydrolytic production of hydrogen with storage material, but not the water used for the hydrolysis, has to be transported to the site of the energy production, which leads to a drastic increase of the useable energy density of such storage systems.

Existing storage materials for the hydrolytic production of hydrogen have, however, serious disadvantages: they are either toxic (e.g. $NaBH_4$—wherein not only $NaBH_4$ itself but also the catalysts used are often toxic), too heavy (e.g. $CaH_2$), too expensive ($H-Mg_3RE$; RE=lanthanides La–Lu), too reactive and not safe and easy to handle (for example all alkali metal hydrides) or—in the case of $MgH_2$, which in principle fulfils all other requirements of such a storage material—too unreactive. The main problem in the use of $MgH_2$, but also of other hydrated magnesium-containing alloys in devices for hydrolytic hydrogen production, is the formation of a passivating surface layer of $Mg(OH)_2$ upon contact of the hydride with water, as a result of which the hydrolysis reaction stops virtually completely after just a very short reaction duration.

The state of the art is the use of nanocrystalline metal hydrides (WO 01/68517) for hydrolytic hydrogen production, where, by means of a high energy input, the reactivity of the hydride was increased so far that, in comparison with polycrystalline metal hydride, increased reaction kinetics could be recorded. For $MgH_2$, for example a reaction yield of 80% is indicated after 20 hours hydrolysis duration in WO 01/68517. However, the very long grinding duration (20 hours) and the energy input required hence for the grinding for the production of the storage material is thereby disadvantageous. In addition, the reaction kinetics with a yield of 80% after 20 hours are still inadequate for producing a hydrolysis which can be controlled by portioning the solid material. In addition, it was found in separate tests that ageing of the metastable nanocrystalline hydrides produced by grinding occurs during storage over several weeks (even at room temperature under argon with $H_2O<1$ ppm, $O_2<1$ ppm), which leads to a significant reduction in the usable storage density of the hydride.

Furthermore, it is known that specific aqueous solutions of certain halogenides promote faster hydrolysis of $MgH_2$ (e.g. CN102491265). However, one serious disadvantage of this is that such a solution would have to be produced in situ, and since these salts are used in addition in a correspondingly high concentration (e.g. 1 mol/liter) and must be transported together with the energy storage material, the useful storage density of corresponding overall systems drops considerably.

The situation looks just as unfavourable when using Brønsted acids or buffers as $Mg(OH)_2$ inhibitors (e.g. DOI 10.1016/j.ijhydene.2012.06.012). In order to prevent formation of passivating $Mg(OH)_2$, to 1 g $MgH_2$ for example 4.9 g of citric acid would have to be added in theory, which corresponds to a reduction in the gravimetric storage density of the overall system of 83%. This general disproportion between storage material and magnesium hydroxide inhibitor is of a similar order of magnitude also in the case of all other Brønsted acids and also in the case of buffers and could be confirmed in many experiments.

A possibility for the catalysis of the hydrolysis reaction according to the state of the art is the addition of expensive noble metal-containing catalysts (e.g. $Pt-LiCoO_2$, DOI 10.1023/B:JMSC.0000017794.92899.bd), wherein besides the pure material costs, also large quantities of catalyst (up to 50% by weight) are being required; furthermore, the use of specific nanocrystalline magnesium hydride-metal oxide composites is known (e.g. CN102060266), wherein essentially the same problems of nanocrystalline materials mentioned for WO 01 68517 are present.

Neither a solution to the problem of inhibition of the hydrolysis by ions present in real water, such as for example phosphate or carbonate for magnesium-containing hydrides, is known nor a solution to the inadequate handling ability of the materials used for the hydrolysis under application conditions (storability, metering ability, starting delay).

Starting from here, it was the object of the present invention to indicate a composite material for the hydrolytic production of hydrogen, which has as simple a composition as possible, a hydrogen storage capacity which is as high as possible and is easy to handle. In addition, it was the object of the present invention to indicate a corresponding device for the hydrolytic production of hydrogen, a device for the production of electrical energy, a method for hydrogen production and also possibilities of use of the hydrolytically produced hydrogen.

This object is achieved, with respect to a composite material for the hydrolytic production of hydrogen, a device for the hydrolytic production of hydrogen, a method for the production of hydrogen, a device for the production of electrical energy, possibilities of use, advantageous developments, as described herein.

The present invention hence relates to a composite material for the hydrolytic production of hydrogen, comprising or consisting of at least one alkaline earth metal-containing metal hydride, at least one additive, selected from the group consisting of water-soluble and/or under influence of water decomposable metal salts with at least one divalent metal cations, and also at least one aprotic, non-polar or low-polar organic substance with at least one carboxylic acid ester group, which is not or only partially miscible with water and has an upper solubility limit of less than 25% by weight (corresponding to 250 g ester/kg water).

In the following, the terms carboxylic acid esters and esters are used synonymously for aprotic, non-polar or low-polar organic substances with at least one carboxylic acid ester group, the term water jointly includes water-containing mixtures. The term substance comprises not only pure substances but also mixtures of substances of variable composition to which an unequivocal CAS registration number can be allocated.

The main advantage of the invention resides in the addition of an ester in combination with a suitable metal salt to the metal hydride so that, on the one hand, a suitable consistency is produced but also a substantial increase in reaction speed of the composite material. Hence, dosing or metering can then take place in a technically very advantageous manner and the water addition results in an extremely high hydrolysis speed. For example, a quantitative yield of composite material and water can be effected within less than 3 minutes (see embodiment 3), which represents a very great improvement, in particular in comparison with a reaction duration according to the state of the art of 20 h in WO 01/68517. Furthermore, very good controllability of the hydrolysis process can be achieved since both, the composite material and the water, can be metered easily.

The composite material according to the present invention is distinguished in particular by the fact that, with the addition of water and release of hydrogen and heat, said composite material undergoes a hydrolysis reaction which is controllable by the quantity of water to be added and which is self-maintaining under water excess, said hydrolysis reaction having a reaction yield of more than 90% after the end of the reaction.

A further advantage of the composite material according to the invention is that it is storage-stable, in particular that, with storage at 20° C. and with the exclusion of moisture, less than 5% by weight of the at least one alkaline earth metal-containing metal hydride situated therein decomposes per month.

In particular, it is advantageous in the case of the composite material according to the invention that all therein contained solid materials decompose, dissolve or undergo a phase change under the influence of water at 100° C.

The main effect of adding a small quantity of a water-soluble and/or under influence of water decomposable salt with at least divalent metal cations to form a hydrated alkaline earth metal-containing material is suspected to be the finely distributed formation of a hydroxide precipitation in the reaction mixture. By means of this dynamic removal of hydroxide ions, the result is a significant reduction in the proton concentration (FIG. 1) in the formed suspension, as a result of which the tendency to form surface alkaline earth metal-hydroxide becomes less, which in turn results in significantly increased reaction kinetics of the hydrolysis. Just as in the aqueous phase, the hydroxide precipitation can also distribute in the carboxylic acid ester, which further increases the reaction kinetics.

Further advantages of the carboxylic acid ester in the composite material are:

Simpler controllability of the reaction is possible because, as a result of the ester in the composite material, an advantageous addition of water to the composite material is made possible (without ester the result of a substoichiometric addition of water to the solid material, is a formation of passivating hydroxide layers on the hydride surface)—see embodiment 2.

Significantly less water is required for the hydrolysis reaction (approx. 1.5 times the stoichiometric quantity is sufficient).

The reaction heat can be used in a better way (since less water, which must be heated during the reaction, is required).

There is a savings potential in the required amount of metal salt additive.

As a result of the dispersion effect of the ester towards hydroxides forming under substoichiometric quantities of water, a significantly improved restarting behaviour is achieved after reaction interruption (see likewise embodiment 2).

A carboxylic acid ester with a defoaming effect can be used and/or the necessity of adding an additional defoaming agent is dispensed with.

In many cases, agitation is unnecessary despite a two-phase mixture—the reaction mixture is therefore also homogenised purely convectively.

Complete thermal decoupling can be achieved (e.g. as a result of better heat transfer from liquid→solid versus gaseous→solid).

The heat exchange can be effected optionally via the ester which is at least liquid under reaction conditions (>25° C.).

Mixture ratios of metal hydride, metal salt additive and ester can be adjusted arbitrarily from the solid state via the pasty to liquid (suspended) state—consequently simple metering possibilities can be achieved, for example by means of a pump, conveying screw, elastomeric balloon, a tube or a tubular bag.

With esters which melt only under the influence of (reaction) heat, composite materials can be produced which are exclusively heat-reactive and hence have improved storage properties (for example on the basis of reduced moisture sensitivity)—see embodiment 4.

Carboxylic acid esters have many advantages in comparison with potentially suitable, known materials for metal hydride suspensions, such as alkanes or ethers: many esters are non-toxic, economical, non-volatile and biodegradable.

In contrast to more strongly polar suspension agents in the composite material, such as for example the organic carbonate (carboxylic acid ester), propylene carbonate, which is not according to the invention, significantly higher reaction speeds can be achieved and/or a much higher overall reaction yield (see FIGS. 11 and 12).

The non-reactivity of most carboxylic acid esters relative to alkaline earth metal-containing metal hydrides is remarkable insofar as, in particular in the case of salt-like hydrides, actually a nucleophilic attack of the hydride on the carbonyl carbon atom of the ester group(s) would be expected. In separate investigations and many tests, it could, however, be confirmed that composite materials consisting of alkaline earth metal-containing metal hydrides, metal salt additives and carboxylic acid esters do not chemically change even over a storage duration of almost a year and hence are obviously not subject to noteworthy ageing (by way of example, the nuclear magnetic resonance spectroscopic examination of an ester before and after storage for a month inter alia with exclusion of air is illustrated in FIG. 13). Obviously, the reactivity, in particular of magnesium hydride, is extremely restricted because of the more highly pronounced covalent bonding character thereof, in comparison with for example alkaline metal hydrides, relative to esters, and hence comparable for example with the reactivity of some complex hydrides.

The composite material according to the invention is contacted with water or a mixture comprising water in order to produce hydrogen. Hydrogen is hereby formed automatically from the alkaline earth metal-containing metal hydride by hydrolysis.

According to a preferred embodiment, the at least one aprotic organic substance with at least one carboxylic acid ester group has a melting point of less than 100° C., preferably between 25 and 95° C. or of less than −20° C. and/or a boiling point of more than 100° C., preferably of more than 150° C. at normal pressure and/or a vapour pressure of less than 1 hPa at 20° C., preferably of less than 10 Pa at 20° C., further preferably of less than 0.4 Pa at 20° C., particularly preferably of less than $10^{-2}$ Pa at 20° C.

Furthermore, it is particularly advantageous if the at least one aprotic organic substance with at least one carboxylic acid ester group does not comprise any acid protons, in particular does not comprise any unesterified acid groups, any hydroxy groups and any primary and secondary amino groups since these would otherwise react with the alkaline earth metal-containing metal hydride.

The at least one aprotic organic substance with at least one carboxylic acid ester group can optionally be composed exclusively of carboxylic acid ester groups and aliphatic, branched and/or aliphatic, unbranched hydrocarbon rests.

Furthermore, it is advantageous if the at least one aprotic organic substance with at least one carboxylic acid ester group comprises exactly one, two, three or four carboxylic acid ester groups.

Preferably, the total quantity of the at least one aprotic, non-polar or low-polar organic substance with at least one carboxylic acid ester group, in the preparation of the composite material, is between 1 and 80% by weight, further preferably between 5 and 70% by weight, further preferably between 10 and 60% by weight, in particular between 21 and 50% by weight, particularly preferably between 30 and 49% by weight.

The at least one aprotic organic substance with at least one carboxylic acid ester group is not or only partially miscible with water and hence has a upper solubility limit of less than 25% by weight (corresponding to 250 g ester/kg water) at 25° C., preferably a solubility upper limit of less than 9% by weight (corresponding to 90 g ester/kg water), in particular of less than 4% by weight (corresponding to 40 g ester/kg water) and further preferably less than 1.5% by weight (corresponding to 15 g ester/kg water), further preferably less than 0.001% by weight (corresponding to 0.01 g ester/kg water). In separate tests, it was recognised that a complete or high miscibility of ester or suspension means and water entails a reduction in reaction speed and/or total reaction yield. The miscibility of ester or suspension means and water is characterised by the solubility of ester/suspension means in water at 25° C. and a greater solubility correlates with stronger polarity. In general, carboxylic acid esters belong to aprotic-non-polar organic substances and typically have a solubility of less than 9% by weight in water.

The composite material according to the present invention is advantageously free of substances which comprise or release hydroxide ions and/or water. In this way, undesired subsidiary reactions in the composite material can be reduced, likewise it is consequently possible to increase further the reactivity of the composite material.

Likewise, it is unnecessary with the present invention that so-called "carrier liquids" must be included, preferably the composite composition according to the present invention is therefore free of such carrier liquids (organic substances which do not comprise carboxylic acid ester groups), such as e.g. alkanes.

Preferably, the composite material is free of glycol esters. Likewise it is preferred if no organic carbonates (carboxylic acid esters), such as e.g. propylene carbonate, are contained in the composite material according to the invention.

In particular the carboxylic acid ester of the of the present invention is selected from carboxylic acid esters which are liquid at room temperature (normal conditions), such as for example octanedioic acid-1,8-dimethyl ester; pentanedioic acid-1,5-dipropyl ester; heptanedioic acid-1,7-diethyl ester; oxacyclotridecan-2-one; hexanedioic acid-1,6-dipropyl ester; decanedioic acid-1,10-dimethyl ester; butanedioic acid-1,4-dibutyl ester; octanedioic acid-1,8-diethyl ester; nonanedioic acid-1,9-diethyl ester; pentanedioic acid-1,5-dibutyl ester; propanedioic acid-1,5-dipentyl ester; dodecanoic acid methyl ester; undecanoic acid ethyl ester; octanoic acid pentyl ester; hexanoic acid heptyl ester; hexanedioic acid-1,6-dibutyl ester; decanedioic acid-1,10-diethyl ester; hexanedioic acid-1,6-bis(2-methylpropyl) ester; butanedioic acid-1,4-dipentyl ester; dodecanoic acid ethyl ester; acetic acid dodecyl ester; heptanoic acid heptyl ester; octanoic acid hexyl ester; hexanoic acid octyl ester; 2,2,4,4-pentanetetracarboxylic acid-1,2,4,5-tetraethyl ester; 1,4-dioxacycloheptadecane-5,17-dione; butanoic acid-1,2,3-propanetriyl ester; tributyric acid glycerol ester; octanoic acid heptyl ester; heptanoic acid octyl ester; hexanoic acid nonyl ester; tetradecanoic acid ethyl ester; octanoic acid octyl ester; tetradecanoic acid-1-methyl ester; hexanoic acid undecyl ester; 1-hexadecanol-1-acetate; decanoic acid octyl ester; hexadecanoic acid-1-methyl ester; decanoic acid decyl ester; hexanedioic acid-1,6-dioctyl ester; hexanedioic acid-1-decyl-6-octyl ester; hexanedioic acid-1,6-dinonyl ester; nonanedioic acid-1,9-bis(2-ethylhexyl) ester; 1,2,3-propanetriol-1,2,3-triacetate [triacetin]; octanoic acid-1,1',1"-(1,2,3-propanetriyl) ester [glyceriol tricaprylate]; decanedioic acid-1,10-bis(2-ethylhexyl) ester [dioctyl sebacate]; hexanedioic acid-1,6-bis(2-ethylhexyl) ester; decanedioic acid-1,10-dibutyl ester; decanoic acid-1,1',1"-(1,2,3-propanetriyl) ester [glycerol tricaprinate]; tridecanoic acid methyl ester; tetradecanoic acid butyl ester; hexanoic acid-1,1',1"-(1,2,3-propanetriyl) ester [glycerol tricapronate]; hexadecanoic acid-(2-ethylhexyl) ester; hexanedioic acid-1,6-dihexyl ester; nonanedioic acid-1,9-dihexyl ester; hexanedioic acid-1,6-diheptyl ester; nonanoic acid butyl ester; dodecanoic acid hexyl ester; nonanoic acid pentyl ester; nonanoic acid heptyl ester; nonanoic acid-1,9-bis(2-ethylbutyl) ester; hexanedioic acid-1,6-bis(2-ethylbutyl) ester; hexanoic acid tetradecyl ester; hexanoic acid tridecyl ester; cyclohexane dicarboxylic acid diester, preferably with linear or branched aliphatic alkylalcoholate substituents on the ester groups —OR, R including 1 to 20 carbon atoms, in particular 1,2-cyclohexane dicarboxylic acid diisononyl ester (DINCH). Triacetin is hereby particularly preferred, since it has at the same time a defoaming effect.

Alternatively and likewise preferably, carboxylic acid esters which are solid at room temperature (normal conditions) can be used, such as in particular tetradecanoic acid methyl ester; hexadecanoic acid methyl ester; dodecanoic acid ethyl ester; octadecanoic acid methyl ester; eicosanoic acid methyl ester; decanedioic acid-1,10-dimethyl ester; docosanoic acid methyl ester; hexadecanoic acid-1-methylethyl ester; tridecanedioic acid-1,13-dimethyl ester; octadecanoic acid butyl ester; eicosanoic acid ethyl ester; docosanoic acid ethyl ester; hexadecanedioic acid-1,16-dimethyl ester; 1,12-dodecanedioic acid-1,12-diacetate; hexadecanoic acid hexadecyl ester; hexanedioic acid-1,6-dioctyl ester; octadecanedioic acid-1,18-diethyl ester; butanoic acid-1,2,3-propanetriyl ester; 1,1,2,2-ethanetetracarboxylic acid-1,1,2,2-tetraethyl ester; oxacyclotridecan-2-one; hexadecanoic acid-1,1',1''-(1,2,3-propanetriyl) ester [tripalmitin]; tetradecanoic acid-1,1',1''-(1,2,3-propanetriyl) ester [trimyristin]; 2,2-bis(octadecanoyloxymethyl)-1,3-propanediyldioctadecanoate [pentaerythritetetrastearate]; octadecanoic acid octadecyl ester [stearyl stearate]; docosanoic acid-1,1',1''-(1,2,3-propanetriyl) ester [tribehenin]; nonadecanoic acid ethyl ester; docosanoic acid docosyl ester [behenylbehenate]; decanoioc acid-1,1',1''-(1,2,3-propanetriyl) ester [tricaprin]; 2,2-bis[(acetyloxy)methyl]propane-1,3-diol-1,3-diacetate; octadecanoic acid-1,1',1''-(1,2,3-propanetriyl) ester [glycerol tristearate]; 2-octadecanoyloxyethyloctadecanoate [ethylene glycol distearate]; dodecanoic acid-1,1',1''-(1,2,3-propanetriyl) ester [trilaurin].

As representative of cyclohexane dicarboxylic acid diesters in particular 1,2-cyclohexane dicarboxylic acid diisononyl ester (DINCH) is suitable, which is generally present as a substance with variable alkylalcoholate substituents. The alkylalcoholate substituents of the ester groups can be e.g. regio- and stereoisomers of the compositions $—OC_8H_{17}$, $—OC_9H_{19}$ or $—OC_{10}H_{21}$. The respective proportion of the $—OC_9H_{19}$-isomers is in particular at approx. 10% n-nonyl-, 35-40% methyloctyl-, 40-45% dimethylheptyl- and 5-10% methylethylhexylalcoholate. Since DINCH concerns a commercial substance, in addition traces of 1,2-benzenedicarboxylic acid dinonyl ester (linear or branched), dinonylether (linear or branched), nonanol (linear or branched), cyclohexanedicarboxylic acid nonyl ester (linear or branched) and 2-methylcyclohexane carboxylic acid nonyl ester (linear or branched) can be contained as impurities. Apart from the 1,2-position the two carboxylic groups in the cyclohexane dicarboxylic acid partial structure, can be attached to the 1,3- or to the 1,4-position of the cyclohexane ring. There are preferred cyclohexane dicarboxylic acid diesters, which are also flowable below –20° C. and hence have a melting point (or pour point) of less than –20° C. and at the same time a vapour pressure of less than $10^{-2}$ Pa at 20° C.

The substance with at least one carboxylic acid ester group is furthermore preferably selected from the group of plasticisers, in particular from the group of phthalates, in particular diisodecyl phthalate and/or diisononyl phthalate and derivatives thereof.

Of course, mixtures and combinations of two or more of the previously mentioned carboxylic acid esters are likewise preferred.

The substance with at least one carboxylic acid ester group can furthermore also have a variable composition, in particular alcoholate substituents of variable composition and/or different isomers in one or more carboxylic acid ester groups.

On the basis of the special carboxylic acid esters which are used in the composite composition according to the invention, preferred formulations can be achieved. In particular in the case where a liquid ester is used, highly viscous and simultaneously flowable pastes with a very high proportion of solid material (alkaline earth metal-containing metal hydride and metal salt additive) can be produced. In the case where a solid carboxylic acid ester compound is used, solid formulations are producible which have higher mechanical and/or chemical stabilities during storage at room temperature and only melt or are melted during or shortly before the reaction, for example in the range between 60 and 80° C. These composite compositions can be handled advantageously since in particular the metering is crucially facilitated. In addition, it was surprisingly noticed that the reactivity of such formulations is significantly increased.

In addition, by means of such formulations a positional independence of a device, which includes or uses the ester, for the production of hydrogen can be effected, i.e. such a composition can be metered into a corresponding reactor, for example from all conceivable positions, in particular also against gravity. This is in particular valid for flowable formulations which have a dynamic viscosity of more than 10 mPa·s, preferably 100 mPa·s, further preferably of more than $10^3$ mPa·s, further preferably of more than $10^4$ mPa·s, particularly preferably of more than $10^5$ mPa·s, respectively under standard conditions or at 80° C. and normal pressure.

According to a further preferred embodiment, the at least one metal salt additive of the composite material forms poorly soluble hydroxides in aqueous solution above pH=8 and/or the hydroxide of the metal cation of the additive has a solubility of less than $10^{-3}$ mol/l in water and/or in the at least one aprotic organic substance with at least one carboxylic acid ester group.

Furthermore, it is preferred that the at least one metal salt additive in the composite material does not react alkaline with water.

Preferably, the at least divalent metal cation of the at least one metal salt additive in the composite material is selected from the IUPAC groups 2, 3, 4, 5, 6, 7, 8, 10, 12, 13, 14 of the periodic table of elements, in particular is selected from the group consisting of $Zn^{2+}$, $Ca^{2+}$, $Mg^{2+}$, $Sn^{2+}$, $Ni^{2+}$, $Fe^{2+}$, $Fe^{3+}$, $Ti^{3+}$, $Ga^{3+}$, $Sc^{3+}$, $Al^{3+}$, $Y^{3+}$, $Ti^{4+}$, $Zr^{4+}$, $Sn^{4+}$, $RE^{3+}$, $RE^{4+}$, RE representing the lanthanides La to Lu of the periodic table.

According to the present invention, it is further preferred if the at least one additive is present in the composite material as metal chloride, -fluoride, -bromide, -nitrate, -amide, -sulphate, -hydrogen sulphate, -acetate, -butyrate, -formiate, -lactate, -malonate, -pyruvate, -tartrate or -citrate.

The at least one additive in the composite material is further preferably selected from the group consisting of zirconium-(IV)-chloride, zirconium-(IV)-acetate, zirconium-(IV)-citrate, zirconium-(IV)-formiate, titanium-(III)-chloride, iron-(III)-chloride, iron-(III)-acetate, iron-(III)-citrate, iron-(III)-formiate, iron-(II)-chloride, magnesium chloride, magnesium acetate, magnesium citrate, magnesium formiate, zinc chloride, zinc acetate, zinc citrate, zinc formiate and also mixtures or combinations hereof.

It is particularly advantageous if the total quantity of the additive in the composite material, relative to the total quantity of the metal hydride, is low. In particular, the total quantity of the additive is ≤15% by mole, preferably 5% by mole, further preferably ≤2.5% by mole.

Preferred alkaline earth metal-containing metal hydrides of the composite material are selected from the group consisting of $MgH_2$, $CaH_2$, $Mg_2NiH_4$, $Mg_2FeH_6$, $Mg_2COH_5$, $Mg_2(Fe_{1-x}Co_x)H_y$ [there applying: 0≤x≤1; 5≤y≤6], $Mg_xRE_{(1-x)}H_y$ [there applying: 0<x≤1; 0<y≤3], $Mg_xTM_{(1-x)}H_y$ [there applying: 0<x≤1; 0<y≤3] and also mixtures and/or combinations hereof, RE representing the lanthanides La to Lu of the periodic table and TM the transition metals of the periodic table.

Likewise, it is possible that an additive is mixed with the alkaline earth metal-containing metal hydride of the composite material in order to improve the hydrogenability and hence the material production, selected from the group consisting of RE oxides, TM oxides, RE nitrides, TM nitrides, RE carbides, TM carbides, RE halogenides, TM halogenides, graphite, graphene, carbon nanotubes, fullerenes and also mixtures and/or combinations hereof, RE representing the lanthanides La to Lu of the periodic table and TM the transition metals of the periodic table.

In addition or instead, the composite material according to the present invention can comprise at least one phosphate-, carbonate- or sulphate scavenger, a scavenger of at least divalent anions and/or a scavenger for chelate complex formers, such as for example a soluble lithium-, calcium-, magnesium- or iron-(III)-salt for precipitating disturbing phosphate- or carbonate ions or for specific binding of chelate complex formers, such as EDTA or crown ethers or a soluble strontium- or barium salt for precipitating disturbing sulphate ions.

Alternatively or additionally hereto, it is likewise possible that the composite material is embedded, encapsulated or welded-in in a water soluble polymer, in particular for example polyvinyl alcohol, starch and/or cellulose, or is present coated with or compacted together with such a polymer.

In particular, the composite material according to the present invention is present as granulate or as powder, as suspension, as paste or in compacted form, such as for example as tablets, as pressed pellets or as a compacted bed.

Likewise, it is possible that the composite material can be present surrounded by an elastic and/or plastically deformable container, in particular a balloon made of a butyl-, epichlorohydrin-, ethylene-propylene-, fluoro-, chloroprene-, chlorine-sulphate-polyethylene-, natural rubber-, nitrile-, perfluoro-, polyurethane- and/or silicone elastomer, a tube or a tubular bag. The tube or the tubular bag can thereby be formed likewise from the previously mentioned materials.

Before use and/or for production, the at least one metal hydride and/or the at least one additive of the composite material can be subjected to mechanical activation, for example by grinding, rolling or forming.

Furthermore it is preferred that the composite material comprises or includes at least one further material for facilitating production, selected from the group consisting of grinding aids, such as for example stearic acid or isooctane, and/or aids for compression, such as for example zinc stearate, graphite, magnesium or a wax, and/or for improvement of the hydrolysis properties, such as for example at least one water-soluble polymer, in particular polyvinyl alcohols, starch or cellulose.

It is also possible that the contained composite material is present compacted together with at least one solid material which is inert towards the metal hydride and acts as binder and/or disintegrant, such as for example microcrystalline cellulose or polyvinyl pyrrolidone.

Preferably the composite material comprises a moisture indicator which for example discolours characteristically in the presence of moisture.

Particularly preferred formulations of the composite materials are thereby based on magnesium hydride, zirconium chloride and/or magnesium chloride and also triacetin as carboxylic acid ester which is liquid at room temperature (e.g. cyclohexanedicarboxylic acid diester) and/or commercially available carboxylic acid ester-based plasticisers (phthalates or derivatives thereof). The commercial cyclohexanedicarboxylic acid diester- or phthalic acid diester-containing plasticisers are characterized by having a very high boiling-/or decomposition point (typically >250° C. at normal pressure) with simultaneously very low melting point (or pour point) of typically less than −20° C. and very low vapour pressure of typically less than $10^{-3}$ hPa under standard conditions. In particular, triacetin and also phthalic acid- and cyclohexanedicarboxylic acid diester are therefore ideal representatives of carboxylic acid esters for composite materials according to the invention. The invention relates in addition to a device for the hydrolytic production of hydrogen which comprises a previously described composite material according to the invention.

The operating principle of the device according to the invention is based on the composite material being contacted therein with water or a water-containing mixture. The alkaline earth metal-containing metal hydride hereby reacts under formation of hydrogen and formation of an alkaline earth metal-containing metal hydroxide.

The composite material is present at least as integral component of the device for the production of hydrogen. A corresponding device can be for example a hydrogen gas generator which comprises a corresponding reaction vessel for the conversion of the composite material, for example with water or water-containing solutions, and is described more precisely in the following.

The device for the hydrolytic hydrogen production is characterised in that the at least one composite material is contacted therein with water or water-containing mixtures and is hydrolysed with formation of hydrogen.

The device for the hydrolytic hydrogen production comprises furthermore, advantageously, a gas-impermeable reaction chamber, at least one supply for the composite material and/or at least one supply for water or the water-containing mixture into the reaction chamber and also at least one outlet for the resulting hydrogen.

Because of simpler production, it is thereby advantageous in particular if the reaction chamber of the device itself does not have or include any electrical components, in particular does not have or include any electrodes. In one embodiment variant of the device for the hydrolytic production of hydrogen, it is however possible that both, the (possibly entire) stock and also the supply for the composite material, are situated inside the gas-impermeable reaction chamber—in addition or alternatively thereto, (some of) the stock and the supply for water or for the water-containing mixture can be situated inside the gas-impermeable reaction chamber. In particular a device which is designed for a discontinuous and/or one-off operation for the hydrogen production can be designed more simply because for example a second gas-impermeable container to protect the composite material from moisture as a component of the device is unnecessary.

Alternatively or additionally, the contact between the at least two reactants in a device according to the invention can be effected by a unit with a capillary effect, for example by a wick, a sponge or by fibres. This embodiment can provide for example that components of the composite material, which are present in liquid form, and/or the water or the water-containing mixture is transported via the unit with the capillary effect. For example, the unit with the capillary effect can lead into the preferably present gas-impermeable reaction chamber which was already mentioned previously. In particular, the water or water-containing mixture is transported by means of the unit with the capillary effect.

Furthermore, the contact between the at least two reactants can be effected by irreversible damage or destruction of a barrier between the reactants, for example by breaking a glass ampoule which comprises one of the reactants or by piercing a membrane which separates the two reactants. Both, the composite material and the water or the water-containing mixture, can thereby be contained in a corresponding compartment. Likewise, it can be provided that the reactants are separated from each other by a membrane which then can be pierced.

It is also possible that the device comprises at least one injection nozzle for the composite material and/or for the water or water-containing mixture and/or that the device comprises at least one condensation- and/or cooling element for water vapour produced during the hydrolysis reaction. One or more injection nozzles thereby facilitate for example a better mixing or finer distribution of the reactants, a condensation unit can serve for recovering water required for the reaction and likewise dry the hydrogen produced in the device.

Alternatively or additionally thereto, it is possible that the device comprises at least one outlet for discharging the waste products produced during the hydrolysis reaction out of the gas-impermeable reaction chamber. By means of such a unit, it is possible for example to operate a device for the hydrolytic production of hydrogen semi-continuously or continuously.

In a further embodiment, the invention likewise relates to a device in which the composite material is stored in a gas-impermeable container separated from the reaction chamber. This container can be connected via a connection pipe to the reaction chamber. The composite material can be conveyed through this connection pipe.

In one embodiment of the device, the contained composite material and/or water or water-containing mixture is stored or provided in an elastic and/or plastically deformable container, for example a balloon made of a butyl-, epichlorohydrin-, ethylene-propylene-, fluoro-, chloroprene-, chlorine-sulphate-polyethylene-, natural rubber-, nitrile-, perfluoro-, polyurethane- and/or silicone elastomer, a tube or a tubular bag. For example, the suspended or pasty composite material is surrounded by the elastic and/or plastically deformable container and, by exerting pressure (mechanical/pneumatic/hydraulic) on the elastic/plastically deformable container, the composite material can be transported into the gas-impermeable reaction chamber.

One variant of the invention includes a device in which the composite material is dosed into the gas-impermeable reaction chamber and/or transported therein by a conveying screw.

A further variant of the invention is characterised in that the device comprises a unit, alternatively or additionally, which induces and/or improves intermixing of the reactants in the gas-impermeable reaction chamber, for example an agitator or an ultrasound generator.

One variant according to the invention of the device likewise comprises, alternatively or additionally, at least one unit for reducing the partial pressures of volatile substances and/or of water vapour and/or for retention of aerosols in or after the outlet for the produced hydrogen, for example an absorber based on zeolite or silica gel, a hydrogen-permeable membrane, a fibre-, a membrane- or sintered filter. Such a unit can accomplish a number of tasks according to the invention, for example free the resulting hydrogen of particles and/or water vapour, serve as liquid barrier or enable for example also completely gas-selective hydrogen permeation.

A further device according to the invention is characterised in that the latter comprises a unit for preventing backflow of water or water vapour from the reaction chamber into the composite material, such as for example a non-return valve or a lock hopper. In particular in the case of a fairly large stock of composite material, this offers the advantage that the reaction can be interrupted by stopping the composite material addition without the composite material in the storage container being undesirably hydrolysed.

A device which comprises a heat exchanger is also possible, by means of which for example heat can be transferred into the reaction chamber or out of the reaction chamber via a thermofluid; one embodiment of this possibility is characterised in that the thermofluid is in direct contact with the composite material and/or is a component of the same. In this case, the thermofluid should be designed such that it is non-reactive relative to the composite material, in particular the alkaline earth metal-containing metal hydride. In particular, the thermofluid should likewise have a boiling point which is above 100° C.

According to one embodiment of the invention, a unit for detecting undesired hydrolysis of the composite material is contained in the device, for example realized by a moisture indicator in the composite material and/or a hydrogen- and/or pressure sensor in the storage container for the composite material. A device for measuring the electrical conductivity of the composite material can represent a further variant of such a unit.

One embodiment of the invention is characterised in that the water-containing mixture, which is contacted in the device with the composite material, comprises at least one substance for lowering the freezing point, for example ethylene glycol, ethanol, glycerol, magnesium chloride, calcium chloride, potassium chloride or sodium chloride.

According to the invention, it is likewise possible that the composite material is manufactured and/or prepared and/or produced in situ in the device. This can be effected for example by a unit contained in the device which blends, brings to react and/or compresses the starting substances required for production of the composite material.

In addition, the present invention relates to a method for the production of hydrogen, in which a composite material according to the invention is contacted with water or a water-containing mixture and is hydrolysed under formation of hydrogen.

For this purpose, water can be used in all possible states of matter, for example as ice, as liquid or as steam. The same applies for water-containing mixtures. Preferably, water or a water-containing mixture is used in the liquid state.

In a preferred embodiment of the method according to the invention, the mixture of composite material and water or water-containing mixture is temperature-controlled in the device during hydrolysis, preferably at temperatures between 10 and 100° C., further preferably between 20 and 80° C.

In particular, the temperature-control is effected by a heat exchange between waste heat of a fuel cell and/or of an internal combustion engine and/or reaction heat of a thermochemical energy store and/or of a chemical reaction and/or electrically generated heat/cold and the composite material or the reaction mixture of composite material and water being effected.

In the case of the method according to the invention, it is additionally preferred that, for controlling the hydrolysis reaction or for determining the hydrolysis rate, one or more of the following variables is monitored and/or regulated and/or controlled as a function of time and/or not as a function of time: pressure, temperature, filling level, hydrogen volume, pH, electrical conductivity, agitation speed, added, or to be added, quantity of composite material and/or added, or to be added, quantity of water or water-containing mixture.

Furthermore, the invention relates to a device for the production of electrical energy which comprises a device for the production of hydrogen and also, subsequently connected, a device for the production of electrical energy from the produced hydrogen, in particular a fuel cell or a heat engine with generator.

The invention likewise relates to uses of the composite material, of the device for the production of hydrogen or of the device for the production of electrical energy or of the method for the production of hydrogen for supplying back up- or emergency power supplies, portable electronic devices, charging devices, lighting, maritime applications, in particular buoys and signals, sensors and probes, self-sufficient radio stations, field batteries, buoyancy generators, and/or demonstrators, e.g. for schools, or trade fairs, with electrical energy and/or hydrogen.

The present invention is explained in more detail with reference to the subsequent embodiments without restricting the invention to specially represented parameters.

Figure 1:
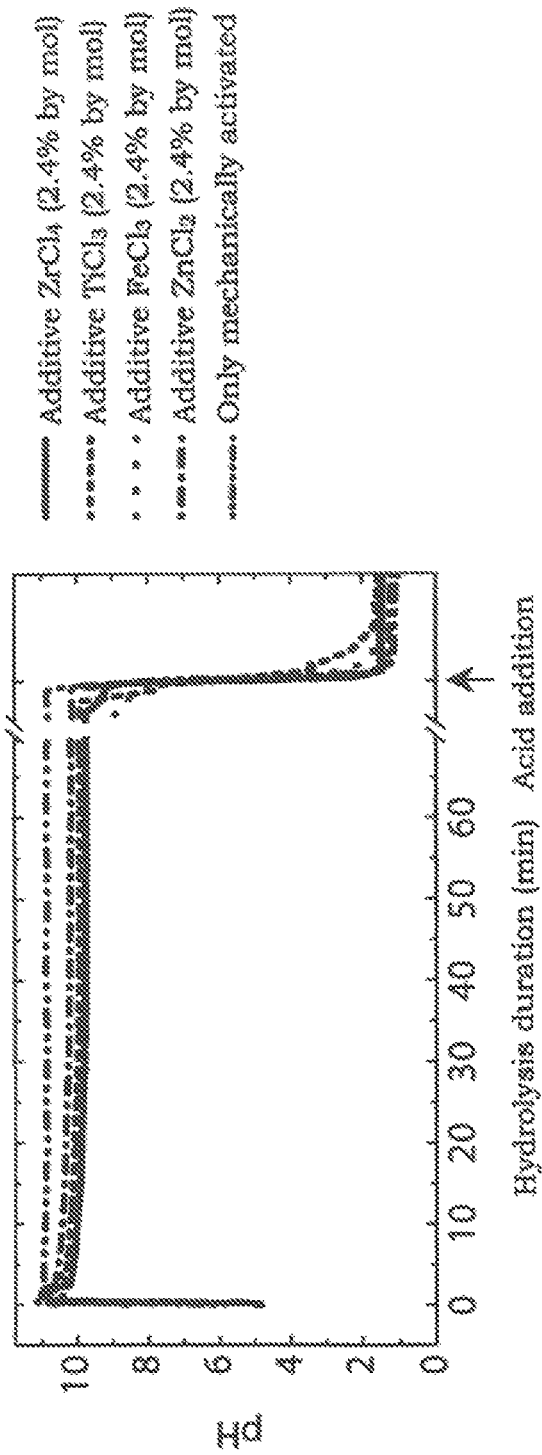
FIG. 1 shows the proton concentration (pH) of the suspension which is formed during the hydrolysis reaction, as a function of the hydrolysis duration for mechanically activated magnesium hydride without additives and for composite materials with selected metal salt additives.
Figure 2:
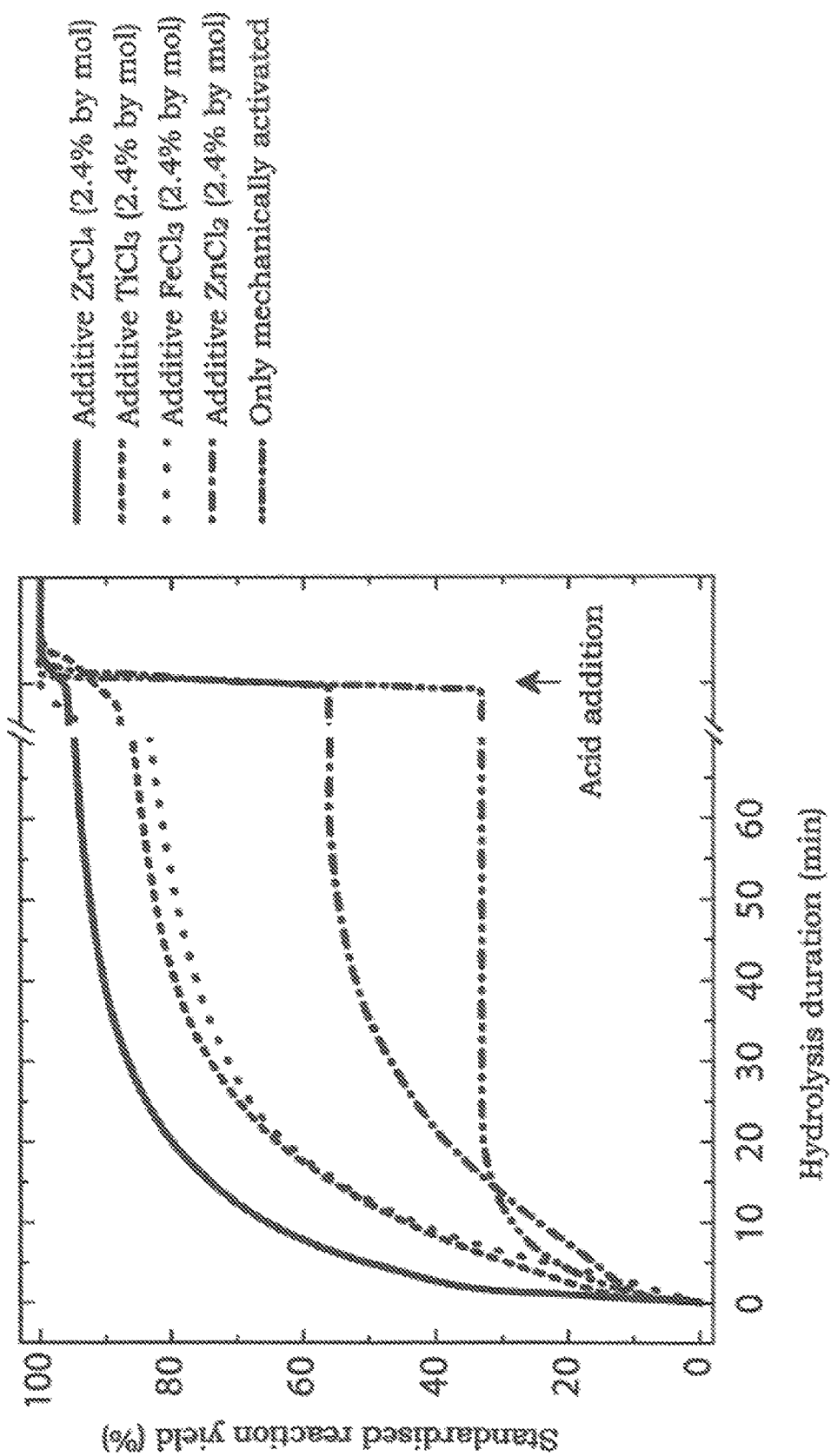
FIG. 2 shows the reaction yield of the hydrolysis reaction as a function of the hydrolysis duration for mechanically activated magnesium hydride without additives and for composite materials with selected metal salt additives.

The solution to the problem of inadequate reaction kinetics and/or a total conversion during hydrolysis of the hydrated alkaline earth metal-containing hydrogen storage materials in devices for the hydrolytic hydrogen production consists inter alia also in the mixing of the (possibly mechanically briefly activated) material to be hydrolysed with at least one additive consisting of a solid, water-soluble salt and/or one hydrolysable with formation of acid, with at least divalent cations (e.g. $Zn^{2+}$, $Ca^{2+}$, $Mg^{2+}$, $Sn^{2+}$, $Ni^{2+}$, $Fe^{2+}$, $Fe^{3+}$, $Ti^{3+}$, $Ga^{3+}$, $Sc^{3+}$, $Al^{3+}$, $Y^{3+}$, $RE^{3+}$, $RE'^{4+}$, $Ti^{4+}$, $Zr^{4+}$, $Sn^{4+}$; RE=La–Lu). Surprisingly, the lowest quantities of many of these salts (e.g. 2.4% by mol of $TiCl_3$, 2.4% by mol of $ZrCl_4$, 2.4% by mol of $FeCl_3$ or 2.4% by mol of $ZnCl_2$) are able to accelerate the hydrolysis reaction extremely effectively so that a reaction yield of in part above 90% is achievable in less than 70 minutes, the reaction yield in these cases for separation of the quantity of metal salt additive for accelerating the reaction kinetics without ester being measured (see FIG. 2).

Several tests have shown that even hydrolysis of alkaline earth-metal containing hydrides with additives, such as $ZrCl_4$, has slower reaction kinetics and also a lower total reaction yield if only water which comprises for example phosphate ions is available for the hydrolysis. Special scavenging reagents are suitable as a remedy for this, such as for example magnesium citrate or lithium chloride which, when added to the metal hydride in a stoichiometric quantity or a small excess (relative to the type of ion to be scavenged), effectively prevent the formation of poorly-soluble salts (e.g. magnesium phosphate) on the surface of the hydride. The poorly-soluble salts instead precipitate, finely distributed, in the reaction solution.

Figure 3:
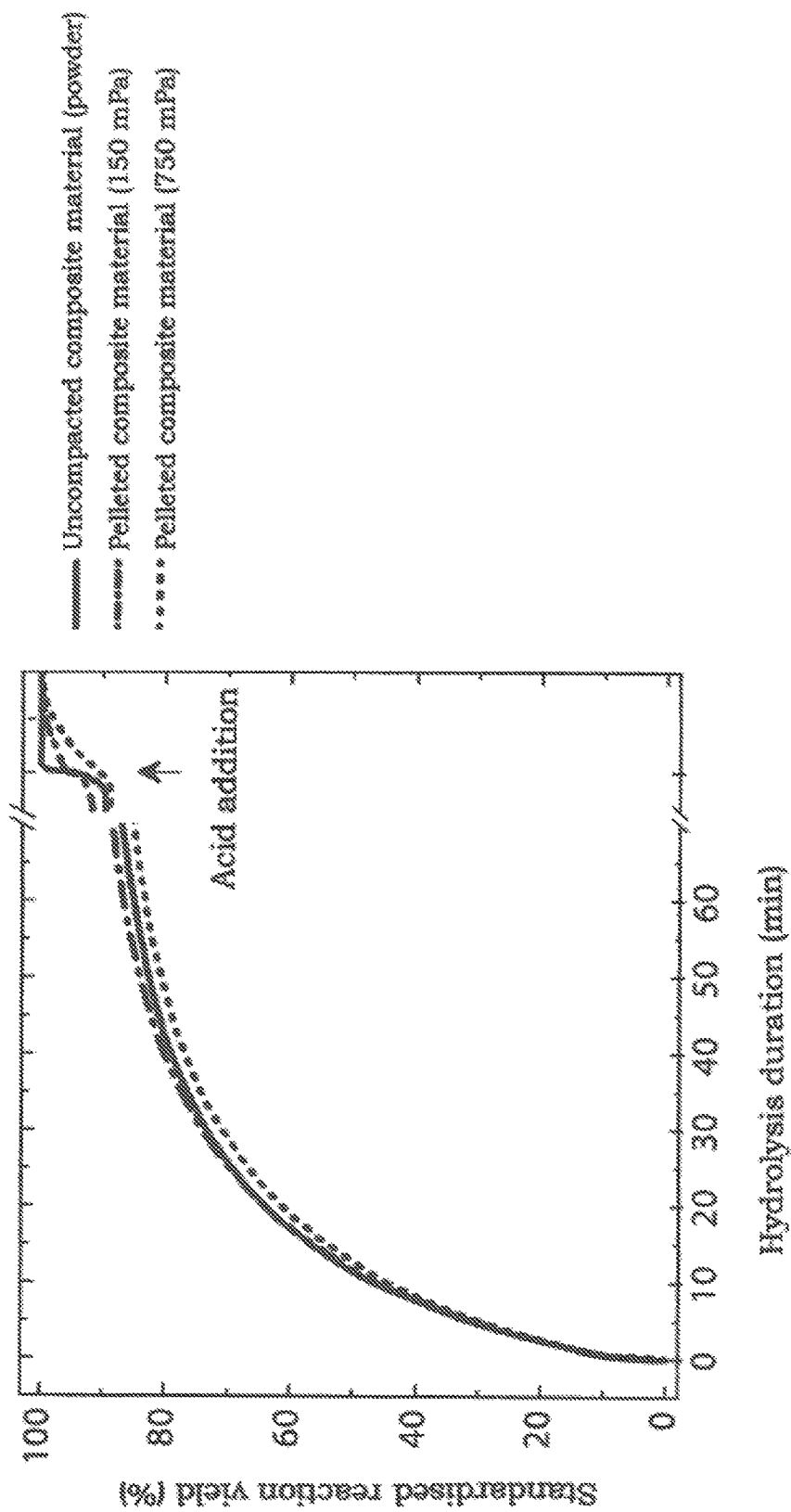
FIG. 3 shows the reaction yield of the hydrolysis reaction as a function of the hydrolysis duration of compacted and non-compacted composite material.
Figure 4:
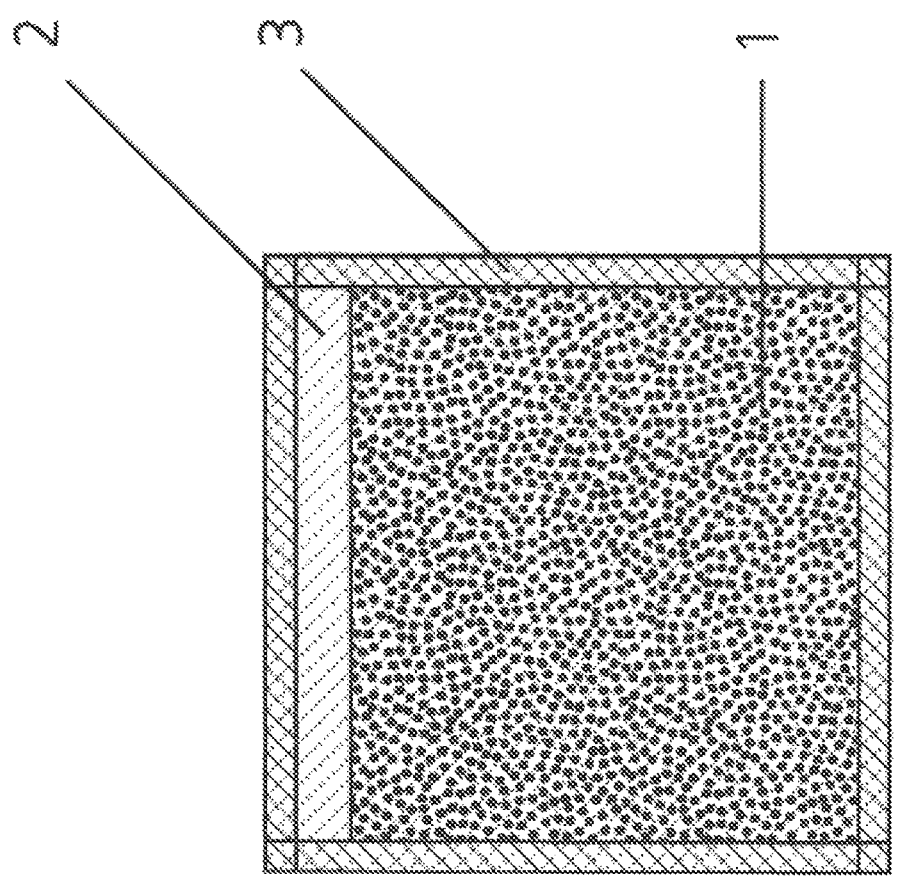
FIG. 4 shows an embodiment of a composite material (1) according to the invention which is sealed in a foil made of water-soluble polymer (2) with weld seams (3).
Figure 5:
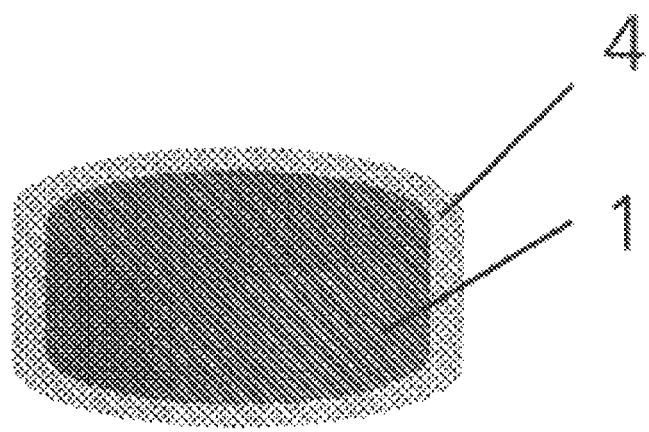
FIG. 5 shows a further embodiment of a composite material (1) compacted according to the invention, which is present coated with water-soluble polymer (4).
Figure 6:
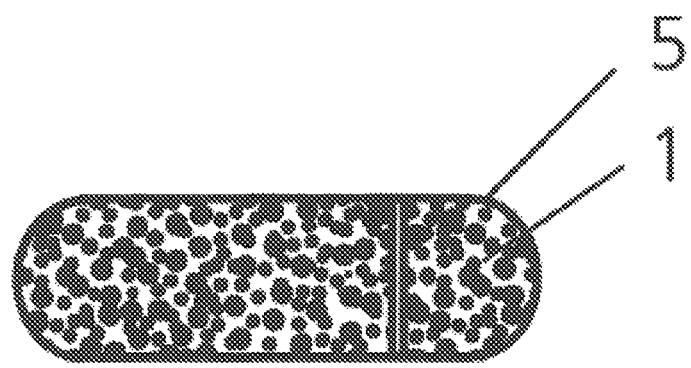
FIG. 6 shows a further embodiment of a composite material (1) according to the invention, which is encapsulated in water-soluble polymer (5).

One solution to the problem of inadequate handling and storability of the metal hydride powder in the device was made possible by compacting the material (e.g. by uniaxial compaction to form tablets or by granulation) and inclusion of the material in water-soluble polymers, such as polyvinyl alcohol. Surprisingly, compaction had, within the scope of measuring tolerances of determining the hydrogen development with many additives, no measurable influence or only a very slight influence on both the reaction kinetics of the hydrolysis and on the total reaction yield (FIG. 3). The inclusion of the material in a water-soluble polymer (FIGS. 4 to 6) had the effect, in contrast, of both a significant improvement in storability of the metal hydride in air and the desired starting delay, produced on the material-side, for the hydrolysis (embodiment 1).

Figure 7:
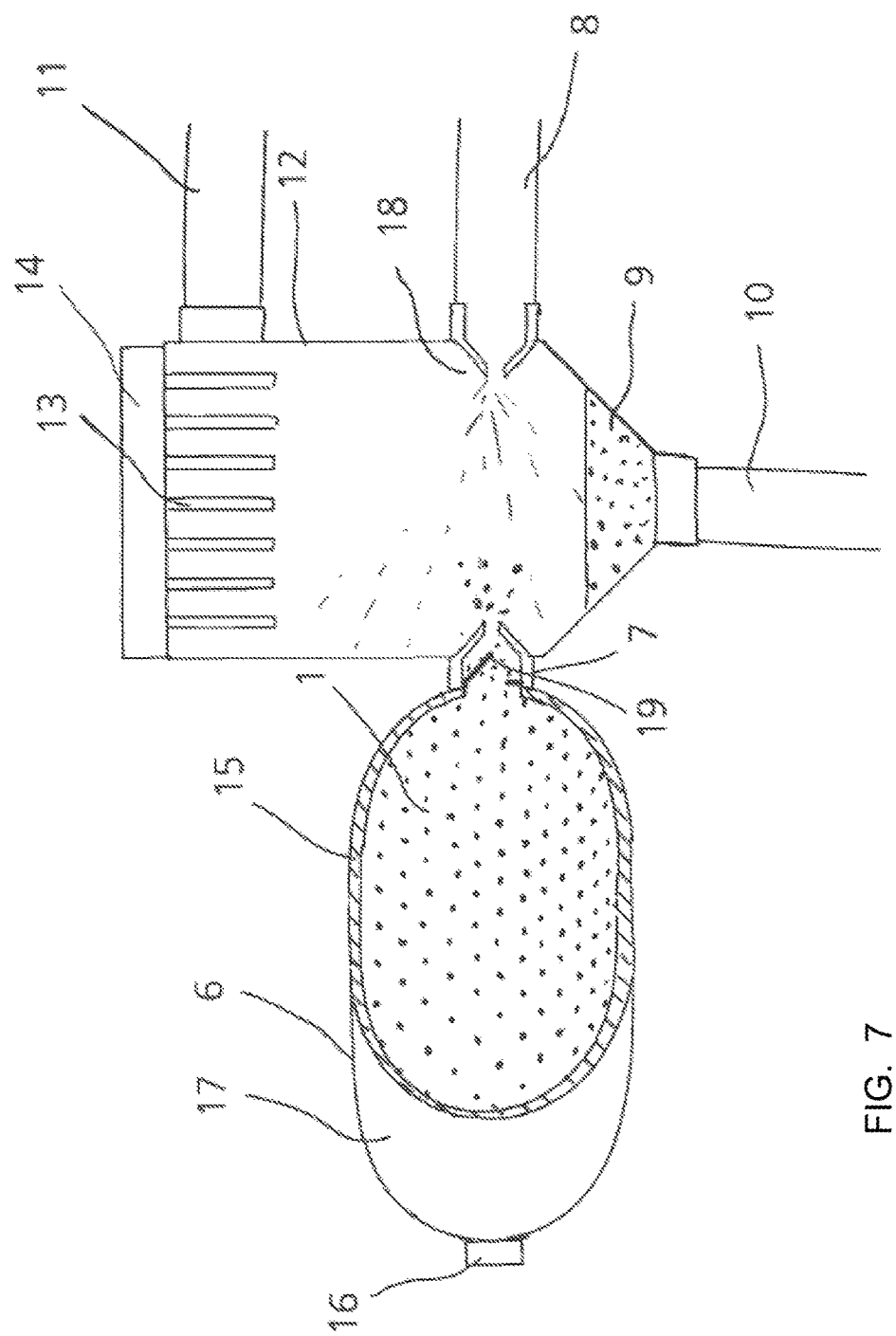
FIG. 7 shows a first embodiment of a device according to the invention for the production of hydrogen.

FIG. 7 shows a first embodiment of a device according to the invention for the production of hydrogen. This comprises a suspended and/or pasty composite material (1) which is present in a separate storage container (6) and which can be supplied to a gas-impermeable reaction chamber (12) by means of an injection nozzle (18) by supply (7) together with water or a water-containing mixture (8), a reaction mixture or waste products (9) which can be removed from the reaction chamber via an outlet (10) and also the resulting hydrogen (11) being produced. Via a cooling element for resulting water vapour (13) and also a fan (14), any water vapour produced during the reaction can be recondensed. The supply of the composite material (1) can be regulated via a gas and/or liquid supply (16) on the storage container (6) which is effective by means of pressure increase in the free space (17) of the storage container on an elastomer internal balloon (15) situated therein. Any water vapour which is possibly flowing back into the storage container (6) out of the gas-impermeable reaction chamber can be prevented by a non-return valve (19).

Figure 8:
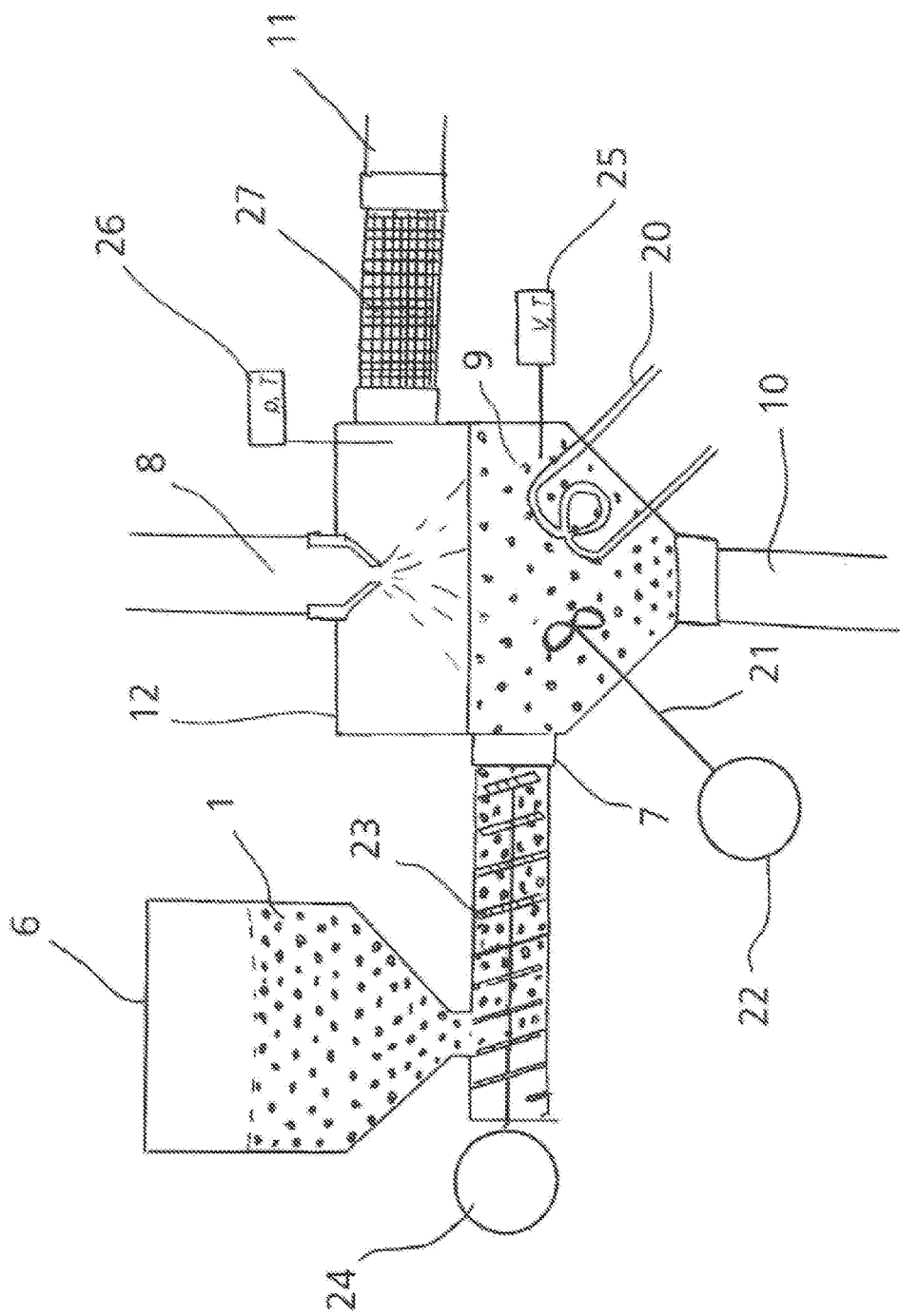
FIG. 8 shows a second device according to the invention for the production of hydrogen.

FIG. 8 shows a second device according to the invention for the production of hydrogen. This comprises a powdery, compacted, pasty, suspended, encapsulated, welded-in or coated composite material (1) which is present in a separate storage container (6) and can be supplied to the gas-impermeable reaction chamber (12) by a supply (7) together with water or a water-containing mixture (8), a reaction mixture or waste products (9), which can be removed from the reaction chamber via a discharge outlet (10) and also the resulting hydrogen (11), being produced. Via a heat exchanger (20), heat can be withdrawn from the reaction chamber or supplied thereto, an agitator (21) with a drive (22) can perform the intermixing of the reaction mixture. The supply of composite material can be effected via a conveying screw (23) with a drive (24) and regulated via measuring/regulating units for level, temperature (25) or pressure, temperature (26). A unit for reducing the partial pressures of volatile substances or particle retention (27) can purify the resulting hydrogen.

Figure 9:
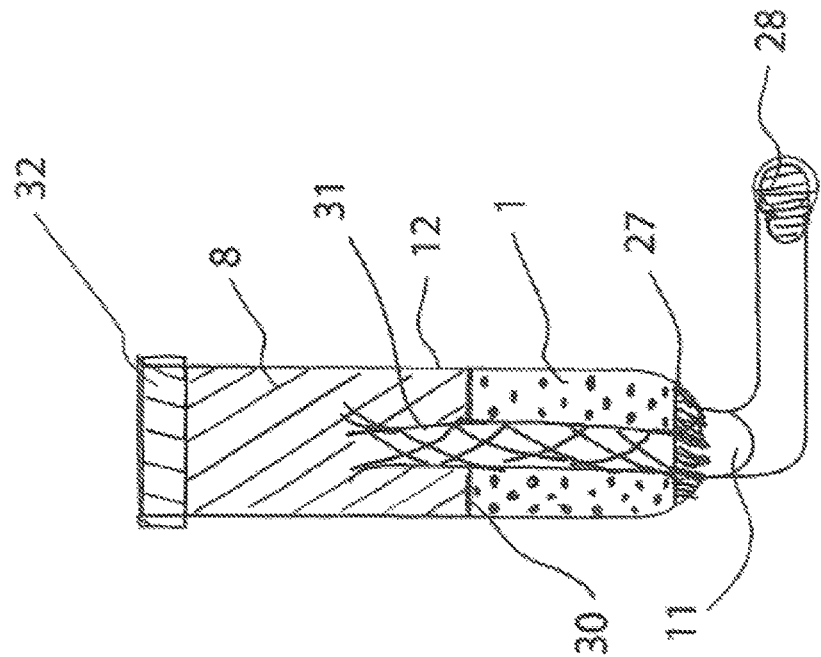
FIG. 9 shows a third device according to the invention for the production of hydrogen.

FIG. 9 shows a third device according to the invention for the production of hydrogen. This comprises a powdery, compacted, pasty, suspended, encapsulated, sealed or coated composite material (1) which is situated directly in the gas-impermeable reaction chamber (12). The water supply (8) is effected here by irreversible damaging of a barrier (29), e.g. a membrane. A unit for reducing the partial pressures of volatile substances or water- or particle retention (27) can purify the resulting hydrogen (11). A gas-impermeable, removable closure (28) can serve for preventing penetration of air into the device before use.

Figure 10:
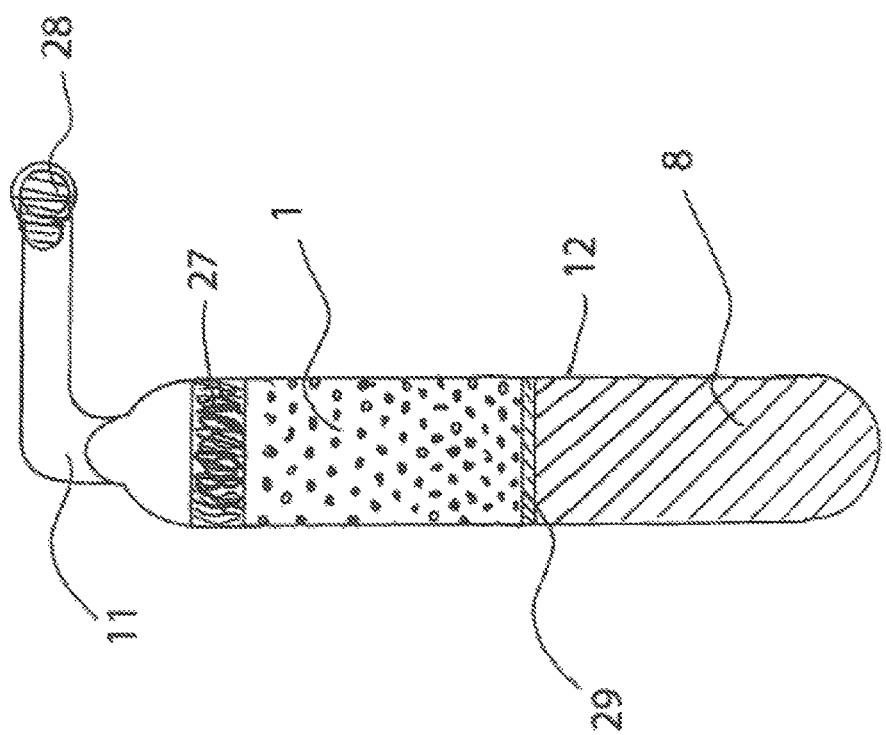
FIG. 10 shows a fourth device according to the invention for the production of hydrogen.

FIG. 10 shows a fourth device according to the invention for the production of hydrogen. This comprises a powdery, compacted, pasty, suspended, encapsulated, welded-in or coated composite material (1) which is situated directly in the gas-impermeable reaction chamber (12). The water supply (8) of the reactants separated by a permanent barrier (30) is effected here by a unit with a capillary effect (31), indicated in the Figure by a wick. A unit for reducing the partial pressures of volatile substances or water- or particle retention (27) can purify the resulting hydrogen (11). A gas-impermeable, removable closure (28) can serve for preventing penetration of air into the device before use, a further closure (32) can serve for filling the device with water or water-containing mixtures.

Figure 11:
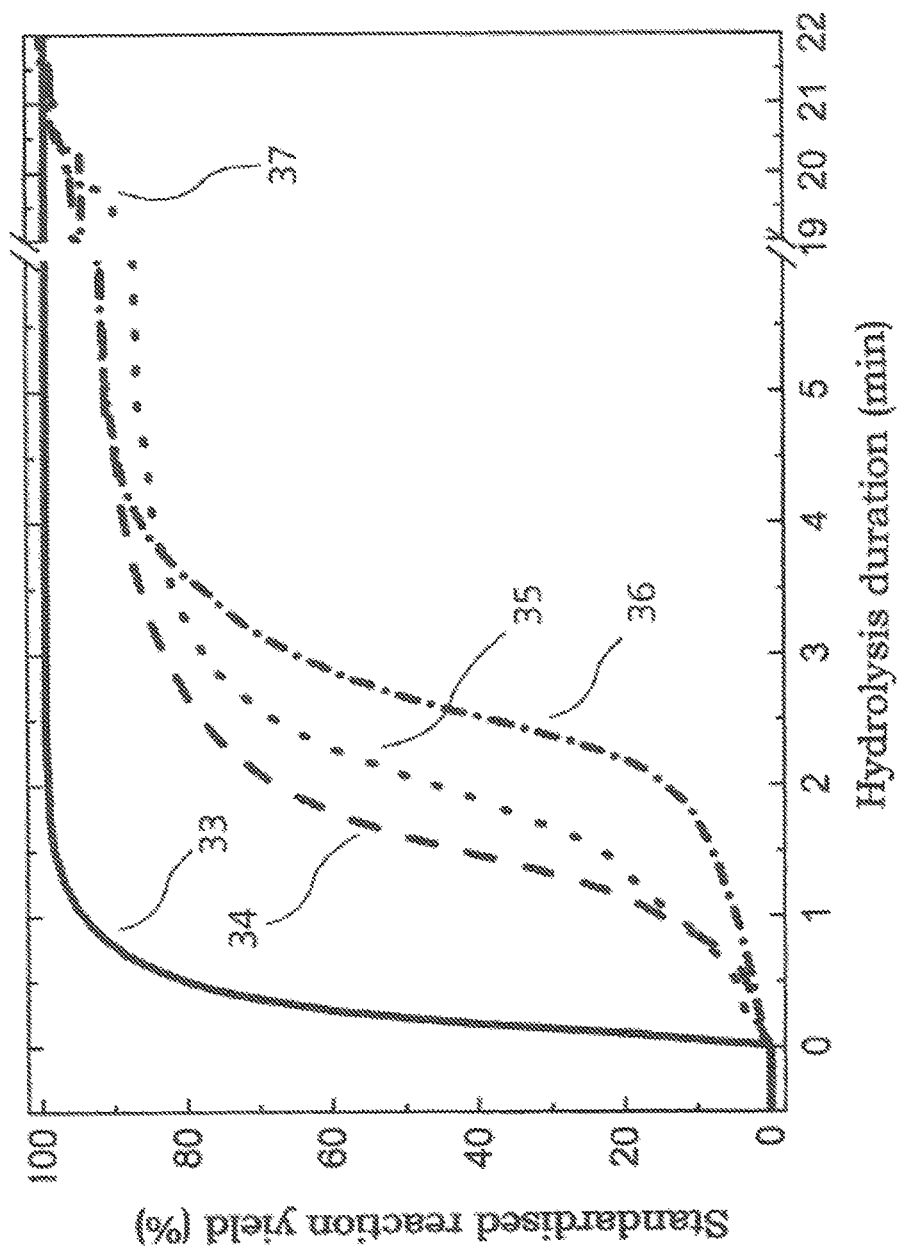
FIG. 11 shows the reaction yield of the hydrolysis reaction of mechanically activated magnesium hydride with metal salt additive in various non-polar or low-polar carboxylic acid esters or mixtures of several carboxylic acid esters according to the invention.

FIG. 11 shows the reaction yield of the hydrolysis reaction of mechanically activated magnesium hydride with metal salt additive, suspended in the carboxylic acid esters or mixtures of carboxylic acid esters, 1,2-cyclohexanedicarboxylic acid diisononyl ester and 1,2,3-propanetriol triacetate, which are according to the invention, non-polar or low-polar and liquid at room temperature, in the gravimetric mixing ratios 7:0:5 (33); 200:66:1 (34); 10:9:1 (35) and 5:4:1 (36), the mixing ratio being indicated in the sequence solids:ester 1:ester 2. The addition of acid (37) serves for standardising the reaction progress.

Figure 12:
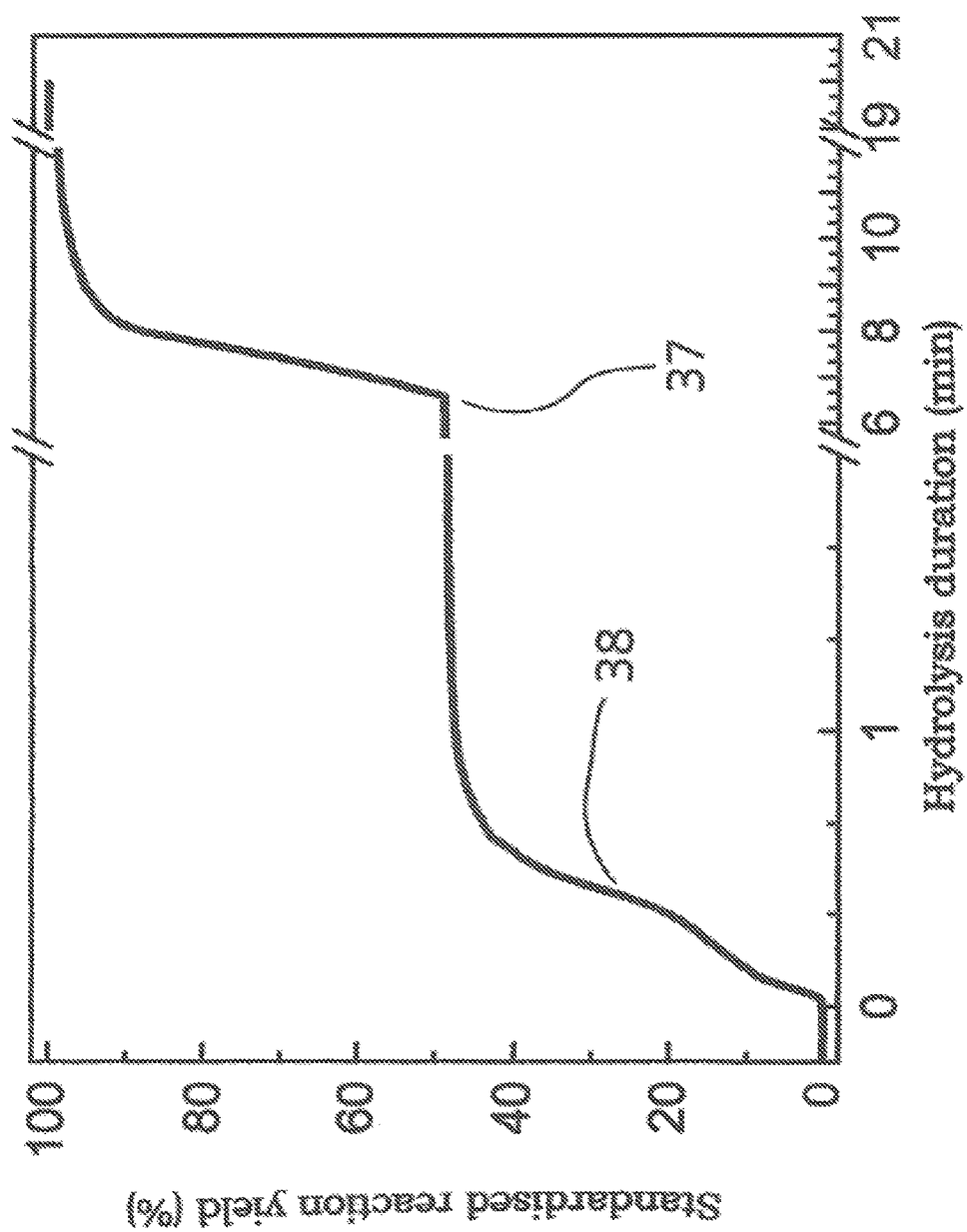
FIG. 12 shows the reaction yield of the hydrolysis reaction of mechanically activated magnesium hydride with metal salt additive in a polar aprotic suspension means, not according to the invention, from the group of organic carbonates (propylene carbonate).

FIG. 12 shows the reaction yield of the hydrolysis reaction of mechanically activated magnesium hydride with metal salt additive, suspended in the polar carboxylic acid ester, propylene carbonate (38), not according to the invention, for comparison. The greater part of the material only reacts after the addition of acid (37).

Figure 13:
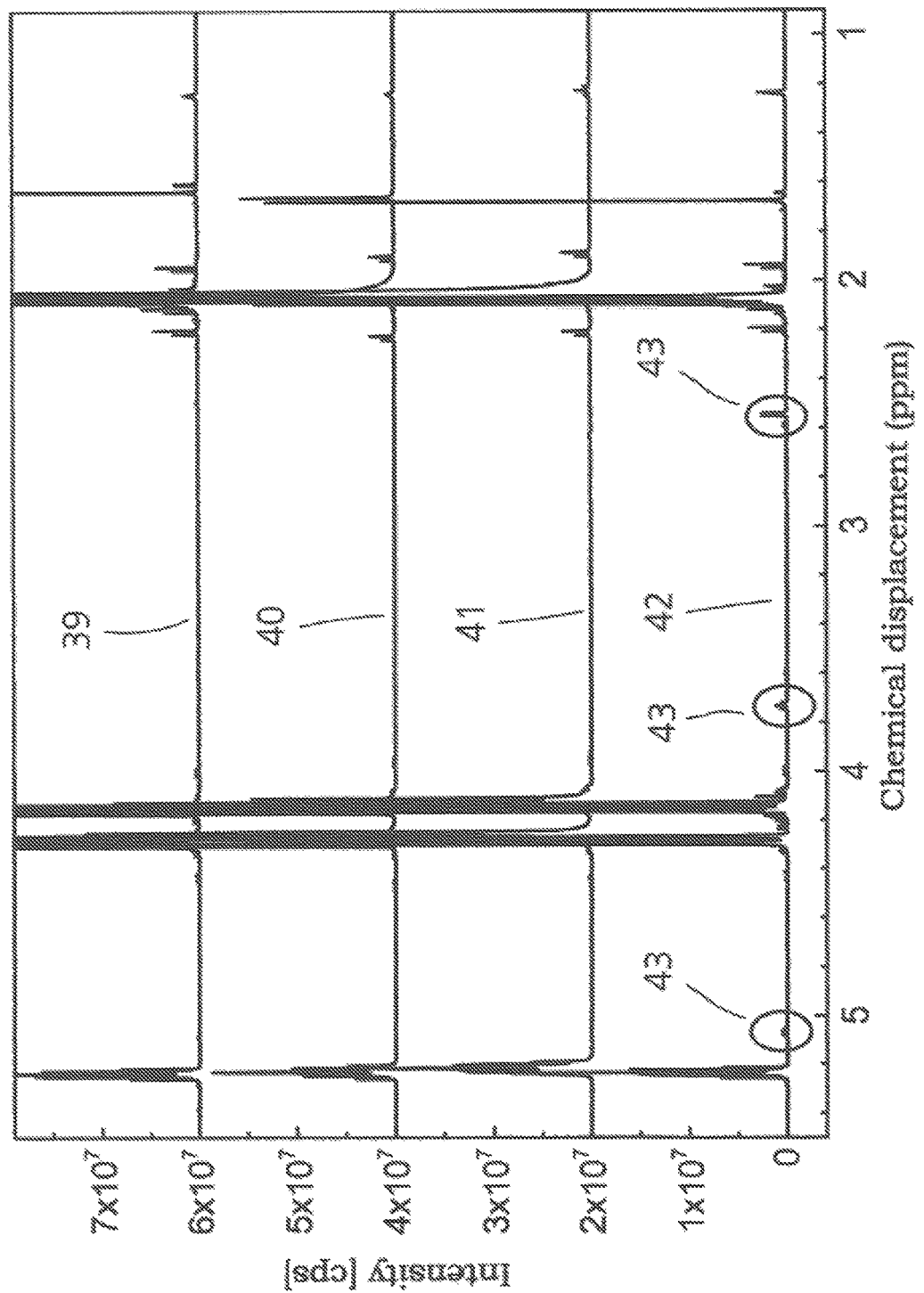
FIG. 13 shows sections of nuclear magnetic resonance spectra of the freshly prepared carboxylic acid ester 1,2,3-propanetriol triacetate and also the spectrum of the same ester recorded after storage for several months as a composite material with magnesium hydride and a metal salt additive under various storage conditions.

FIG. 13 shows sections of $^1$H-nuclear magnetic resonance spectra of the carboxylic acid ester 1,2,3-propanetriol triacetate, freshly prepared (39), and also the spectrum of the same ester, recorded respectively after being stored for several months as composite with magnesium hydride and a metal salt additive under argon (40), in dry air (41) and in moist air (42). Traces of organic impurities (43) can be detected only after storage for several months under the influence of air humidity. The composite materials according to the invention are therefore extremely storage-stable.

Possible fields of application comprise inter alia:
small to average back up- or emergency power supplies
portable electronic devices and charging devices
camping- and outdoor sphere
lighting
maritime applications (buoys and signals)
sensors and probes
self-sufficient radio stations
military applications (e.g. field batteries)
buoyancy generators (for production of hydrogen as buoyancy gas)
demonstrators (e.g. for schools or trade fairs)

EMBODIMENTS

The reaction yields of all embodiments were determined by measurements of the hydrogen volume produced at the respective time in a device for the hydrolytic production of hydrogen. The total hydrogen volume determined respectively in total (after the addition of a Brønsted acid in excess) at the end of the reaction served for standardisation. All measured volumes were recalculated to normal conditions by means of the determined air pressure, the temperature measured in situ and also the water vapour partial pressure at the given conditions.

Example 1

Approx. 2 g mechanically briefly (≤1 h) activated composite materials consisting of $MgH_2$ and various additives were sealed in pre-dried PVA bags (under argon and under vacuum). A visible hydrolysis of the metal hydride or of one of the additives (inflation of the PVA bag) was not observed even after a storage duration of more than one month (in dry air). Subsequently implemented hydrolyses in a device for hydrolytic hydrogen production produced an initial delay of the reactions of at least 15 seconds.

Example 2

A device for the hydrolytic hydrogen production consisting of a gas-impermeable reaction chamber, a hydrogen outlet with integrated sintered metal filter, a water-cooled vapour condenser, a water supply and also a composite material supply with 13 g of a mechanically briefly 1 h) activated pasty mixture of 4 g dry 1,2,3-propanetriol triacetate as well as 9 g of $MgH_2$ with 2.4% by mol of $MgCl_2$ was purged with argon in a first step. Subsequently, 6, 12, 25 and 40 ml of deionised water were dosed successively into the reaction chamber. According to the respective water dosage, total hydrogen volumes (standard conditions) of 3,200 ml, 7,800 ml, 11,600 ml and 13,400 ml, corresponding to 24%, 58%, 86%, 99% total reaction yield, were recorded at the gas outlet after less than 5 minutes reaction duration after each addition of water. A very good restarting behaviour (duration of less than 1 minute) was established after each individual water dosage.

Example 3

A device for the hydrolytic hydrogen production consisting of a gas-impermeable reaction chamber, a hydrogen outlet with integrated sintered metal filter, a water-cooled vapour condenser, a water supply and also a composite material supply with 2 g of a mechanically briefly (≤1 h) activated pasty mixture of 1 g of dry 1,2,3-propanetriol triacetate and also 1 g of $MgH_2$ with 1.1% by mole of $ZrCl_4$ was purged with argon in a first step. Subsequently, 6.2 ml of deionised water was dosed into the reaction chamber. The total yield of the hydrolysis was 97% after only 160 seconds reaction duration.

Example 4

A device for the hydrolytic hydrogen production consisting of a gas-impermeable reaction chamber, a hydrogen outlet with integrated sintered metal filter, a water-cooled vapour condenser, a water supply, a heat exchanger and also a composite material supply with 1.5 g of a mixture which was briefly activated mechanically (≤1 h), then pressed into a tablet at 150 MPa pressure, was purged with argon in a first step. The tablet consisted of 0.5 g pentaerythrite tetrastearate and 1 g of $MgH_2$ with 1.1% by mole of $ZrCl_4$. Subsequently, 6.2 ml of deionised water at 25° C. was dosed into the reaction chamber. Even after almost one hour, the total yield of the hydrolysis was less than 2%. Subsequently, the gas-impermeable reaction chamber was heated to 70° C. via the heat exchanger. Immediately after the melting of the pentaerythrite tetrastearate, the reaction started and completed within 340 seconds yielding 100% reaction conversion.

Example 5

A device for the hydrolytic hydrogen production consisting of a gas-impermeable reaction chamber, a hydrogen outlet with integrated membrane filter as well as a gas volume meter for measuring the reaction progress, a water-cooled vapour condenser, a water supply and also a composite material supply with 1 g of a mechanically briefly (approx. 5 minutes) activated pasty mixture was purged with argon in a first step. The pasty mixture consisted of $MgH_2$ with 2% by mole of $MgCl_2$ as well as 1,2-cyclohexane dicarboxylic acid diisononyl ester and 1,2,3-propanetriol triacetate in the gravimetric mixing ratios 7:0.5, 200:66:1, 10:9:1 and 5:4:1, respectively. Subsequently, approx. 2.8 ml of deionised water at 25° C. was dosed into the reaction chamber. After approx. 20 minutes, an excess of amidosulphuric acid was added as Brønsted acid for standardisation of the reaction progress. The reaction progress calculated from the measured gas volumes is illustrated in FIG. 11.

Example 6

A device for the hydrolytic hydrogen production consisting of a gas-impermeable reaction chamber, a hydrogen outlet with integrated sintered metal filter and also a gas volume meter for measuring the reaction progress, a water-cooled vapour condenser, a water supply as well as a composite material supply with 2 g of a mechanically briefly (≤1 h minutes) activated pasty mixture was purged with argon in a first step. Not according to the invention, the pasty mixture consisted of 1 g of $MgH_2$ with 1.1% by mole of $ZrCl_4$ and also 1 g of the carboxylic acid ester, propylene carbonate. Subsequently, approx. 6.2 ml of deionised water at 25° C. was dosed into the reaction chamber. After approx. 7 minutes, an excess of amidosulphuric acid was added as Brønsted acid for standardisation of the reaction progress. The reaction progress calculated from the measured gas volumes is illustrated in FIG. 12.

The invention claimed is:

1. A method for the production of hydrogen comprising contacting a composite material comprising or consisting of
   a) at least one alkaline earth metal-containing metal hydride selected from the group consisting of $MgH_2$, $CaH_2$, $Mg_2NiH_4$, $Mg_2FeH_6$, $Mg_2CoH_5$, $Mg_2(Fe_{1-x}CO_x)H_y$ with $0 \leq x \leq 1$; $5 \leq y \leq 6$, $Mg_xRE_{(1-x)}H_y$ with $0 < x \leq 1$; $0 < y \leq 3$, $Mg_xTM_{(1-x)}H_y$ with $0 < x \leq 1$; $0 < y \leq 3$ and mixtures and/or combinations thereof, RE representing the lanthanides La to Lu of the periodic table and TM the transition metals of the periodic table,
   b) at least one additive selected from the group consisting of metal salts with at least divalent metal cations, which are water-soluble and/or decompose under the influence of water, and
   c) at least one aprotic, organic substance with at least one carboxylic acid ester group, which is not or only partially miscible with water and has an upper solubility limit of less than 25% by weight at 25° C. corresponding to 250 g ester/kg water,
   with water or a water-containing mixture.

2. The method according to claim 1, wherein the mixture of composite material and water or water-containing mixture is temperature-controlled during hydrolysis.

3. The method according to claim 1, wherein the at least one aprotic organic substance with at least one carboxylic acid ester group has
   a) a melting point of less than 100° C.,
   b) a boiling point of more than 100° C., and/or
   c) a vapour pressure of less than 1 hPa at 20° C. at normal pressure.

4. The method according to claim 1, wherein the at least one aprotic organic substance with at least one carboxylic acid ester group does not comprise any acidic protons, any hydroxy groups, or any primary and secondary amino groups.

5. The method according to claim 3, wherein the at least one aprotic organic substance with at least one carboxylic acid ester group does not comprise any acidic protons, any hydroxy groups, or any primary and secondary amino groups.

6. The method according to claim 1, wherein the at least one aprotic organic substance with at least one carboxylic acid ester group is composed exclusively of carboxylic acid ester groups and aliphatic, branched and/or aliphatic, unbranched hydrocarbon groups.

7. The method according to claim 1, wherein the at least one aprotic organic substance with at least one carboxylic acid ester group comprises one, two, three, or four carboxylic acid ester groups.

8. The method according to claim 1, wherein the total quantity of the at least one aprotic organic substance with at least one carboxylic acid ester group is between 1 and 80% by weight.

9. The method according to claim 1, wherein the at least one aprotic organic substance with at least one carboxylic acid ester group has an upper solubility limit in water of less than 9% by weight.

10. The method according to claim 1, wherein the at least one aprotic organic substance with at least one carboxylic acid ester group
    a) does not comprise any substance which comprise or release hydroxide ions and/or water and/or
    b) is free of a carrier liquid which is chemically inert towards the metal hydride and does not comprise a carboxylic acid ester group.

11. The method according to claim 1, wherein the at least one aprotic organic substance with at least one carboxylic acid ester group is selected from the group consisting of
    a) carboxylic acid esters which are liquid at room temperature, b) carboxylic acid esters which are solid at room temperature,
c) plasticisers, and
d) mixtures and combinations of at least two of the carboxylic acid esters.

12. The method according to claim 1, wherein the at least one aprotic organic substance with at least one carboxylic acid ester group has one or more alcohol substituents and/or isomers of one or more carboxylic acid ester groups.

13. The method according to claim 1, wherein the at least one additive forms a poorly soluble hydroxide in an aqueous solution above pH=8 and/or the hydroxide of the metal cation of the additive has a solubility of less than $10^{-3}$ mol/l in water and/or in the at least one aprotic organic substance with at least one carboxylic acid ester group.

14. The method according to claim 1, wherein the at least divalent metal cation of the at least one additive is selected from the IUPAC groups 2, 3, 4, 5, 6, 7, 8, 10, 12, 13, and 14 of the periodic table of elements.

15. The method according to claim 1, wherein the at least one additive is a metal chloride, -fluoride, -bromide, -nitrate, -amide, -sulphate, -hydrogen sulphate, -acetate, -butyrate, -formate, -lactate, -malonate, -pyruvate, -tartrate or -citrate.

16. The method according to claim 1, wherein the total quantity of the at least one additive, relative to the total quantity of the metal hydride, is ≤15% by mole.

17. The method according to claim 1, wherein the additive is selected from the group consisting of RE oxides, TM oxides, RE nitrides, TM nitrides, RE carbides, TM carbides, RE halogenides, TM halogenides, graphite, graphene, carbon nanotubes, fullerenes and mixtures and/or combinations thereof, RE representing the lanthanides La to Lu of the periodic table and TM representing the transition metals of the periodic table.

18. The method according to claim 1, wherein the composite material further includes at least one phosphate-, carbonate- or sulphate scavenger, a scavenger for at least divalent anions and/or a scavenger for chelate formers, for precipitating disturbing phosphate- or carbonate ions or for specific binding of chelate formers.

19. The method according to claim 1, wherein the composite material is embedded, encapsulated or welded-in in a water soluble polymer, starch and/or cellulose, or is present coated with or compacted together with such a polymer.

* * * * *